United States Patent [19]

Kiba et al.

[11] Patent Number: 4,498,414
[45] Date of Patent: Feb. 12, 1985

[54] VEHICLE BODY PAINTING ROBOT

[75] Inventors: Hiroshi Kiba, Hiroshima; Yoshimasa Itoh, Yokohama; Kiyuji Kiryu, Kawasaki, all of Japan

[73] Assignees: Mazda Motor Corporation, Hiroshima; Tokico Ltd., Kawasaki, both of Japan

[21] Appl. No.: 445,153

[22] Filed: Nov. 29, 1982

[30] Foreign Application Priority Data

Nov. 30, 1981 [JP] Japan .................. 56-193397

[51] Int. Cl.³ ............................................. B05B 13/02
[52] U.S. Cl. .................................. 118/663; 118/697; 118/500; 118/323; 901/43; 901/46; 901/47
[58] Field of Search ............... 414/736, 735, 730; 118/697, 323, 500, 675, 663; 901/43, 46, 47

[56] References Cited

U.S. PATENT DOCUMENTS

| | | | |
|---|---|---|---|
| 3,709,190 | 1/1973 | Gottberg et al. | 118/323 X |
| 4,239,431 | 12/1980 | Davini | 118/323 X |
| 4,342,535 | 8/1982 | Bartlett et al. | 414/744 A |
| 4,342,536 | 8/1982 | Akeel et al. | 414/744 A |
| 4,357,900 | 11/1982 | Buscher | 118/323 X |
| 4,409,718 | 10/1983 | Pryor | 29/407 |
| 4,423,999 | 1/1984 | Choly | 118/500 |

FOREIGN PATENT DOCUMENTS 2827770  1/1980  Fed. Rep. of Germany ...... 118/323

*Primary Examiner*—Shrive P. Beck
*Attorney, Agent, or Firm*—Oblon, Fisher, Spivak, McClelland & Maier

[57] ABSTRACT

A vehicle body painting robot for automatically coating a paint on vehicle bodies which are transferred along a conveyer line, the robot including an arm which is supported on a pedestal rotatably in both vertical and horizontal planes, and a paint applicator for spraying the paint toward a vehicle body delivered to a coating booth. The robot is provided with a door handler on the arm for opening and closing the vehicle door before and after painting the inner side and marginal peripheral portions of the vehicle door.

11 Claims, 10 Drawing Figures

VEHICLE BODY PAINTING ROBOT

BACKGROUND OF THE INVENTION

1. Field of the Invention

This invention relates to improvements in a robot for painting vehicle bodies, and more particularly to a robot which is capable of opening and closing a vehicle door painting the interior surface of a vehicle body or peripheral side portions of the door in connection with.

2. Description of the Prior Art

Recently, the automation of the operations of painting the bodies of motor vehicles is advancing step by step with the development of coating robots which are capable of painting even the interior surfaces of vehicle bodies as well as relatively inaccessible peripheral side portions of the vehicle doors and the like.

However, the doors of the vehicle body have to be opened and closed before and after coating the inner side of the vehicle body and peripheral portions of doors as mentioned above. In the conventional coating process, it has been the usual practice to open and close the doors by manual labor of stationed workers, failing to achieve the complete automation of the coating operation. On the other hand, there has been developed robots or apparatus which are designed exclusively for performing the door opening and closing operation, for use in combination with the coating robot. Obviously, the provision of such door handling robots will result in coating equipments which are increased in size and complicated in construction, in addition to increases in cost and complications in maintenance and service of the equipments.

SUMMARY OF THE INVENTION

In view of the foregoing situations, the present invention has as its object the provision of a robot for painting vehicle bodies, which has the function of opening and closing vehicle doors in addition to the normal paint coating function.

It is another object of the present invention to provide a robot for automatically painting vehicle bodies which are transferred along a conveyer line, the robot being capable of opening and closing a vehicle doors before and after painting the inner side and peripheral portions of the door of a vehicle body by itself.

It is a further object of the present invention to provide a robot for painting vehicle bodies, which can achieve full automation of the operation of painting a vehicle body including its inner side and the peripheral portions of the vehicle door.

It is a still further object of the invention to provide a vehicle body painting robot which can reduce the equipments cost by performing by itself the operations of painting vehicle bodies, and opening and closing of the vehicle doors, coupled with facilitated maintenance and service.

In order to attain the foregoing objects, the present invention provides a robot for coating a paint on a vehicle body which is transferred along a conveyer line, the robot comprising: an arm supported on a pedestal rotatably in both horizontal and vertical planes; a paint applicator supported on said arm for spraying a paint toward the vehicle body; and a door handler mounted on said arm and engageable with the door of the vehicle body to open or close the door.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

In the accompanying drawings

PARTICULAR DESCRIPTION OF THE INVENTION AND PREFERRED EMBODIMENTS

Figure 1:
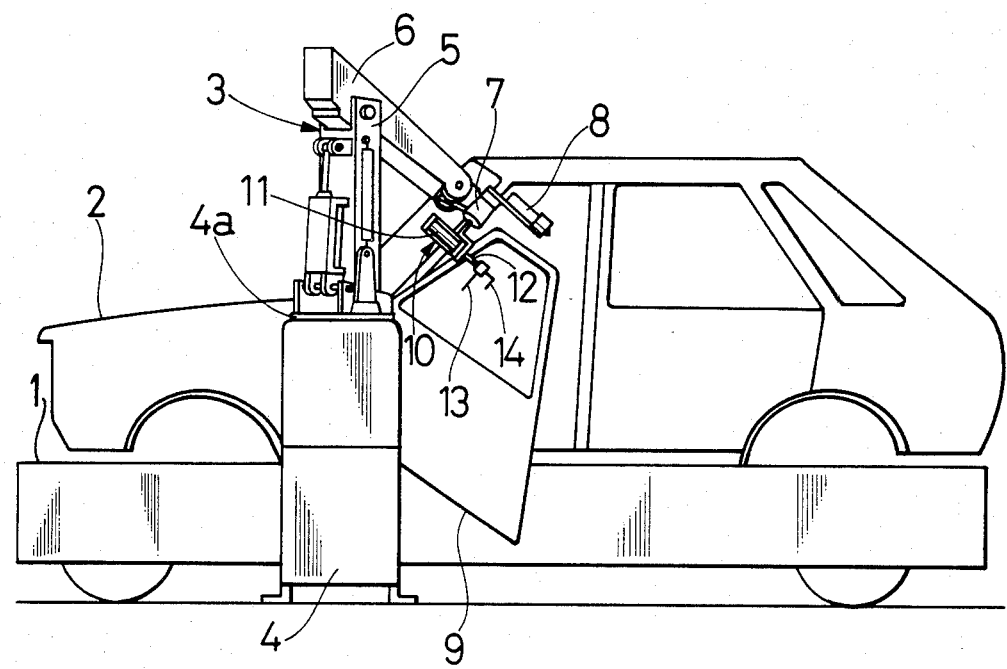
FIG. 1 is a schematic view of a vehicle body painting robot according to the present invention.

Now, the invention is described in greater detail by way of the preferred embodiments shown in the drawings.

Figure 2:
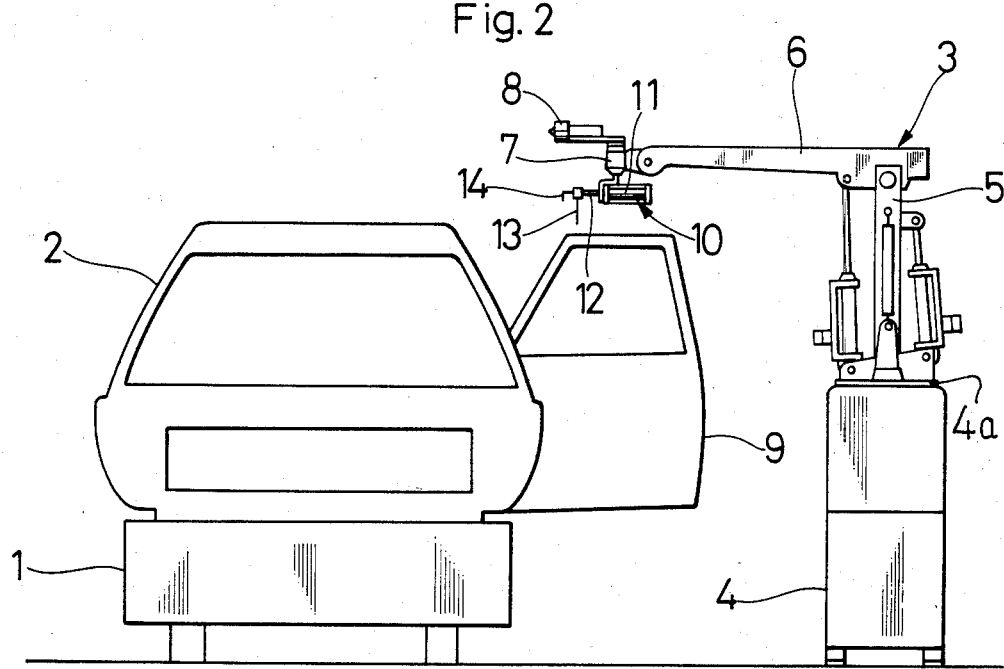
FIG. 2 is a left-hand side view of the robot of FIG. 1.
Figure 3:
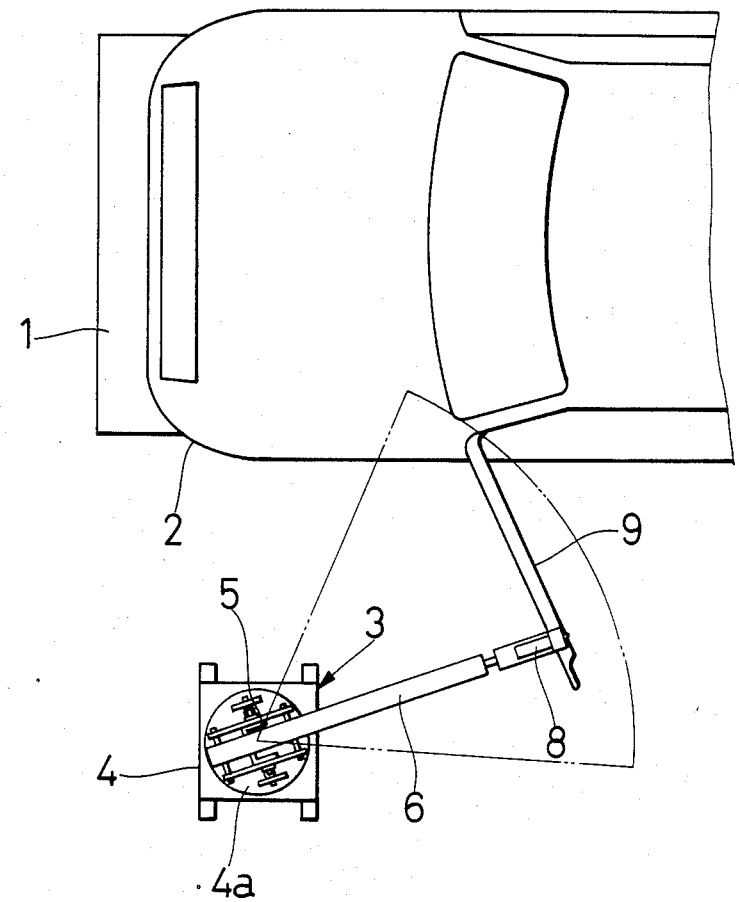
FIG. 3 is a plan view of the robot of FIG. 1.

Referring first to FIGS. 1 to 3, there are illustrated a vehicle body painting robot 3 according to the present invention and a vehicle body 2 which has been delivered to a paint coating at a predetermined speed along a conveyer line from an assembly line by operation of a conveyer 1. The vehicle body painting robot 3 is located in the coating booth at a position close to the conveyer line. The coating robot 3 is either fixed on the floor or mounted on a carriage which is movable along the conveyer lines. Although the robots 3 is described as being a fixed type in the present embodiment, it may of course be replaced by a movable type.

The coating robot 3 is provided with a turn table 4a on a pedestal 4, and a first arm 5 which is erected on the turn table 4a rotatably in horizontal and vertical planes. Attached to the fore end of the first arm 5 is a second arm 6 which is rotatable in a vertical plane. Supported at the fore end of the second arm 6 is a rotary actuator 7 which in turn support on its output shaft a paint applicator 8 for spraying a paint toward the vehicle body. The paint applicator 8 is rotatable in a horizontal plane. Thus, the position of the paint applicator 8 can be changed in the range indicated by chain line in FIG. 3 by operating the first and second arms 5 and 6, and the paint spraying nozzle of the paint applicator 8 is directed toward the vehicle body at predetermined angles irrespective of the positions of the first and second arms 5 and 6.

Figure 4:
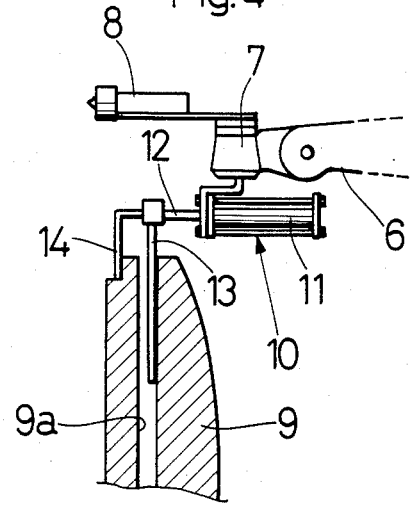
FIG. 4 is an enlarged fragmentary view explanatory of the door opening and closing operations.

The vehicle body 2 is coated by spraying a paint by the paint applicator 8 by operating the first and second arms 5 and 6 in the above-described manner. As mentioned hereinbefore, it is necessary to open the vehicle door 9 prior to painting the inner side of the vehicle body and the peripheral portions of the door 9. Besides, the door has to be closed upon completion of the painting operation to transfer the vehicle to a next station in closed state. In order to open and close the vehicle door 9 in this manner, the rotary actuator 7 is provided with a door handler 10 which, as shown particularly in FIG. 4, includes a piston-cylinder 11 fixedly supported on the output shaft of the rotary actuator 7, a rod member 12 reciprocably connected to the piston-cylinder 11, a thrust finger 13 fixedly secured substantially to a midpoint of the rod 12, and a stopper member 14 securely fixed to the distal end of the rod 12 to delimit the thrusting depth and position of the finger 13. For opening and closing the door 9, the first and second arms 5 and 6 are driven from the rotary actuator 7 to position the door handler 10 over the door 9, and the finger 13 is thrusted into a window lifter groove 9a of the door 9, then operating the first and second arms 5 and 6 to pull or push the door 9. The reason why the finger 13 is inserted into the window lifter groove 9a in this manner is to prevent the door handler 10 from contacting and damaging the coated paint film of the door 9 which is still in wet state when the door is closed immediately after the coating operation.

Thus, the painting robot 3 automatically opens and closes the vehicle door if necessary while the vehicle body 2 is transferred through the coating booth by the conveyer 1. For this purpose, a teaching operation is performed by the use of the robot before the actual painting operation, storing in a memory device (not shown) the contents of the teaching operation including the sequence of actions necessary for the door opening and closing operation and the painting operation. The door opening and closing operation and painting operations are performed by playing back the memorized sequence of actions according to the contents of teaching.

In the first place, as soon as the conveyer 1 delivers a vehicle body 2 into the coating booth with the vehicle door 9 in closed state, the robot 3 is actuated to displace the first and second arms 5 and 6 in synchronism with the transfer speed of the vehicle body 2, locating the finger 13 of the door handler 10 immediately above the window lifting groove 9a. In this instance, fine adjustment of the position of the thrust finger 13 is possible through operation of the piston-cylinder 11 of the door handler 10. In this state, the door handler 10 is lowered to thrust the finger 13 into the window lifter groove 9a, and the door 9 is opened by applying a pulling force to the door handler 10. Since the door lock is not yet mounted on the door 9 in the coating stage, it can be opened or closed by application of a slight pulling or pressing force.

As soon as the door 9 is opened, the finger 13 is disengaged from the window lifter groove 9a, and the paint applicator 8 is actuated to spray a paint over the vehicle body 2. In this instance, the paint is readily coated on the inner side of the vehicle body and the peripheral portions of the door 9 since the latter is in opened state.

After coating the vehicle body 2 in the above-described manner, the door handler 10 is actuated again, thrusting the finger 13 into the window lifter groove 9a and pushing the door 9 into closed position to complete the coating operation. The coated vehicle body 2 is sent forward to a next station of the conveyer line.

In some cases, the vehicle body 2 is delivered to the coating booth with the door 9 in opened state. In such a case, the paint coating operation is started immediately on arrival of the vehicle body 2, and the vehicle door 9 is closed after finishing the coating operation by operating the door handler 10 in the above-described manner.

Figure 5:
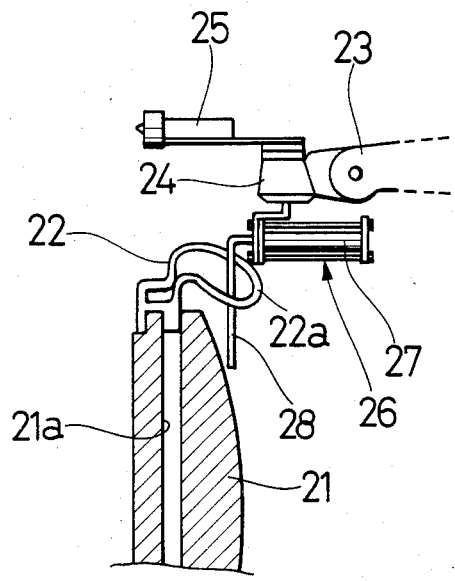
FIG. 5 is a view similar to FIG. 4 but showing a second embodiment of the present invention.
Figure 6:
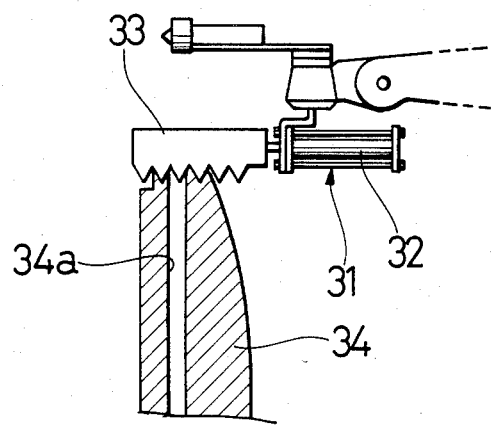
FIG. 6 is a view similar to FIG. 4 but showing a third embodiment of the present invention.
Figure 7:
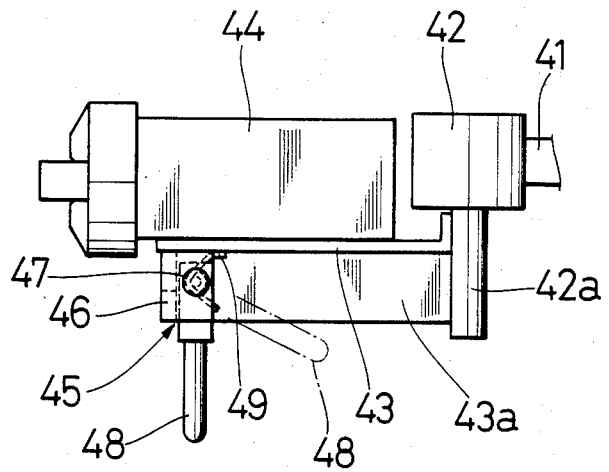
FIG. 7 is an enlarged fragmentary view showing major component parts in a fourth embodiment of the invention.
Figure 7:
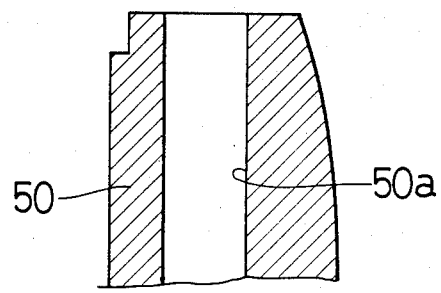
Figure 8:
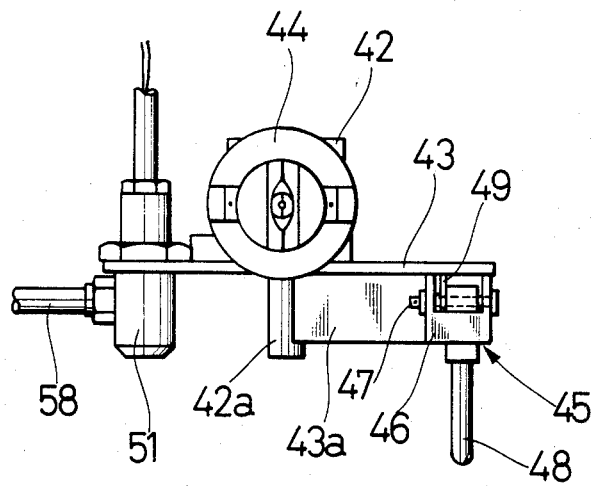
FIG. 8 is a left-hand side view of the robot of FIG. 7.
Figure 9:
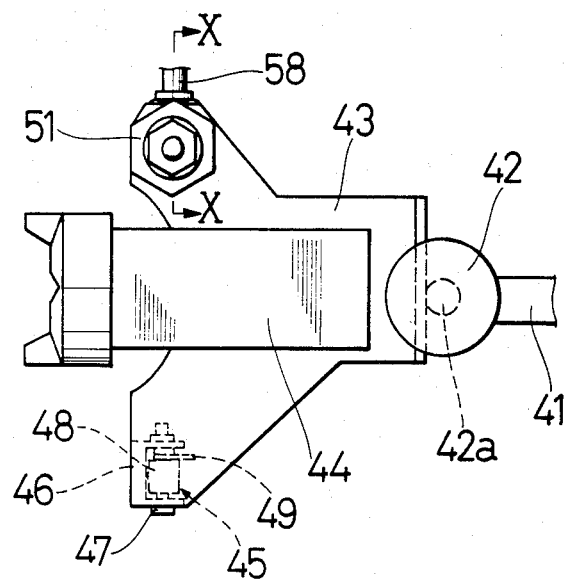
FIG. 9 is a plan view of the robot of FIG. 7.

Referring now to FIGS. 5 and 6, there are shown the second and third embodiments of the present invention, respectively. In the second embodiment of FIG. 5, an attachment 22 with a ring 22a fitted in a window lifter groove 21a of a vehicle door 21 for cooperation with a door handler 26 which is connected to a rotary actuator 24 along with a paint applicator 25 at the fore end of a second arm 23. The door handler 26 includes a piston-cylinder 27 with a reciprocable rod which is bent downward to form a finger 28. The door 21 is opened or closed by inserting the finger 28 into the ring 22a followed by contraction or extension of the piston-cylinder 27.

On the other hand, in the third embodiment of FIG. 6, the door handler 31 is constituted by a piston-cylinder 32 and a saw-tooth-like member 33 which is reciprocably supported on the piston-cylinder 32. In this case, a tooth of the saw-tooth-like member 32 is engaged with the edge portions at the upper end of a window lifter groove 34a of a vehicle door 34 at the time of opening and closing the door 34.

Referring to FIGS. 7 to 10, there is illustrated a fourth preferred embodiment of the present invention, in which a rotary actuator 42 is mounted on the fore end of a second arm 41 of the painting robot. The output shaft 42a of the rotary actuator 42 has a support plate 43 securely fixed thereto for supporting a paint applicator 44 fixedly thereon. On the other hand, a door handler 45 is fixedly mounted in a lower portion of the support plate 43. The door handler 45 includes a substantially U-shaped bracket 46 which is fixedly secured to the lower side of the support plate 43, a shaft 47 which is mounted on the bracket 46, a finger 48 which is rotatably supported on the shaft 47, and a spring 49 which constantly urges the finger 48 into abutting engagement with the back side of the bracket 46. The bracket 46 is linked to the output shaft 42a through a reinforcing plate 43a which is provided in a lower portion of the support plate 43. The vehicle door 50 is opened or closed by inserting the finger 48 in the window lifter groove 50a of the door 50. In this case, should the finger 48 be abutted against the upper side of the door 50 without engaging in the window lifter groove 50a upon actuation of the door handler 45, the finger 48 is rotated about the shaft 47 against the biasing action of the spring 49 as indicated in phantom in FIG. 7. Therefore, upon lifting up the door handler 45, the finger 48 is returned to the initial position by the action of the spring 49 to abut again on the back side of the bracket 46.

Figure 10:
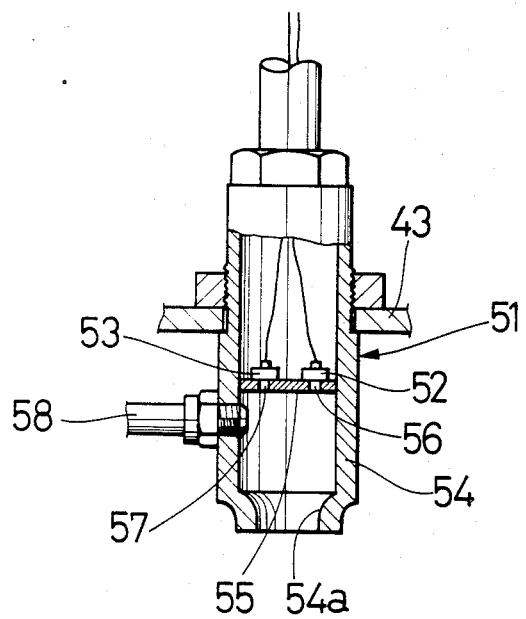
FIG. 10 is a fragmentary sectional view taken on line X—X of FIG. 9.

When the delivered vehicle body is in a deviated position away from a regular position or when the door 50 of the delivered vehicle body is in a half-open state, there arises a problem that it becomes difficult to insert the finger 48 correctly in the window lifter groove 50a. In order to preclude this problem in this embodiment, a sensor 51 which detects the position of the window lifter groove 50a of the door 50 is provided on the support member 43 along with the door handler 45. The just-mentioned sensor 51 is aligned with the door handler 45 on a line which perpendicularly intersects the axis of the second arm 41. The sensor 51 consists of, for example, an ultrasonic wave generator 52 and a receiver 53 as shown in FIG. 10. The ultrasonic wave generator 52 and receiver 53 are mounted on a base plate 55 within a housing 54 which is fixedly provided on the support plate 43. The ultrasonic wave which is passed through an aperture 56 in the base plate 55 advances toward the door 50 through the opening 54a at the lower end of the housing 54, and the ultrasonic wave which is reflected on the bottom surface of the window lifter groove 50a is received by the receiver 53 through an aperture 57 in the base plate 55, detecting the position of the window lifter groove 50a by measuring the time length from the generation to the reception of the transmitted ultrasonic wave. The above-mentioned ultrasonic sensor 51 may be replaced by an optical sensor if desired.

If the sensor 51 is located close to the paint applicator 44 as described above, it is constantly held in the spray of the paint. Consequently, it is very likely that the sprayed paint deposit on the generator 52 and the receiver 53, impairing the function of detecting the position of the window lifter groove 50a by the sensor 51. In order to avoid this, an air feed pipe 58 is connected to the housing 54 for supply of purging air, the air feed pipe 58 blowing air into the housing 54 and through the opening 54a at the lower end of the housing 54 to prevent the paint from entering the housing 54.

With the above-described construction, the finger 48 of the door handler is securely fitted in the window lifter groove 50a no matter whether the delivered vehicle body is deviated from a regular position or the vehicle door 50 is in a half-open state.

What is claimed is:

1. A robot for coating a paint on a vehicle body which is transferred along a conveyor line, said robot comprising:
   (a) an arm supported on a pedestal rotatably in both horizontal and vertical planes;
   (b) a rotary actuator supported at the fore end of said arm;
   (c) a paint applicator supported on the output shaft of said rotary actuator for spraying a paint toward said vehicle body; and
   (d) a door handler supported on the output shaft of said rotary actuator and engagable with the door of said vehicle body to open or close said door.

2. A vehicle body painting robot as set forth in claim 1, wherein said door handler is provided with a finger member to be fitted in a window lifter groove of said door.

3. A vehicle body painting robot as set forth in claim 2, wherein said finger member is axially movable through operation of a piston-cylinder.

4. A vehicle body painting robot as set forth in claim 2, wherein said finger member is displaceably supported on a bracket.

5. A vehicle body painting robot as set forth in claim 2, wherein said door handler is provided with a sensor for detecting the position of said window lifter groove of said door.

6. A vehicle body painting robot as set forth in claim 5, wherein said sensor is a non-contact type sensor.

7. A vehicle body painting robot as set forth in claim 6 wherein said sensor is an ultrasonic sensor.

8. A vehicle body painting robot as set forth in claim 6, wherein said sensor is connected to an air feed pipe to receive a supply of purging air thereby to prevent deposition of sprayed paint on sensing portions of said sensor.

9. A vehicle body painting robot as set forth in claim 1, wherein said door handler is provided with a finger member to be inserted in a ring which is formed on an attachment to be fitted in a window lifter groove of said door.

10. A vehicle body painting robot as set forth in claim 1, wherein said door handler is provided with a sawtooth-like member to be fitted in a window lifter groove of said door.

11. A robot for coating a paint on a vehicle body which is transferred along a conveyor line, said robot comprising:
   (a) an arm supported on a pedestal, said arm being rotatable in both the horizontal and vertical planes;
   (b) a paint applicator supported on said arm for spraying a paint towards said vehicle body;
   (c) a door handler mounted on said arm and engagable with the door of said vehicle body to open or close said door, said door handler being provided with a finger member to be fitted in a window lifter groove of said door; and
   (d) a non-contact sensor mounted on said arm for detecting the position of said window lifter group of said door, said sensor being connected to an air feed pipe to receive a supply of purging air, thereby preventing deposition of sprayed paint on sensing portions of said sensor.

* * * * *